United States Patent [19]

Martin et al.

[11] Patent Number: 5,185,928
[45] Date of Patent: * Feb. 16, 1993

[54] WINDOW CUTTER FOR GAS SERVICE TIE OVERS AND TIE-OVER METHOD

[75] Inventors: Luther W. Martin, Champaign; Richard L. Smith, Edwardsville, both of Ill.; Jesse W. Cotherman, Camby, Ind.

[73] Assignee: Insertec Systems, Inc., Champaign, Ill.

[*] Notice: The portion of the term of this patent subsequent to Apr. 23, 2008 has been disclaimed.

[21] Appl. No.: 792,448

[22] Filed: Nov. 15, 1991

[51] Int. Cl.$^5$ .............................................. B22B 5/00
[52] U.S. Cl. ........................................ 30/92.5; 83/745
[58] Field of Search ........................... 30/92.5, 92, 372; 81/9.4; 83/54, 745, 861

[56] References Cited

U.S. PATENT DOCUMENTS

| | | | |
|---|---|---|---|
| 1,178,801 | 4/1916 | Griffin | 30/92.5 |
| 2,293,754 | 8/1942 | Ludke et al. | 30/92.5 |
| 3,613,236 | 10/1971 | Lauck | 30/92.5 |
| 5,009,007 | 4/1991 | Martin et al. | 30/92 |

Primary Examiner—Douglas D. Watts
Assistant Examiner—Hwei-Siu Payer
Attorney, Agent, or Firm—Barnes & Thornburg

[57] ABSTRACT

A pipe slitter comprises a base for fixing the slitter to a pipe to be slit thereby. The base includes a pair of end plates for mounting transversely of the pipe and a carriage guide for coupling the end plates to each other. The carriage guide extends longitudinally of the pipe. The carriage guide movably supports a first carriage. A second carriage movably supports a slitter blade. The second carriage is movably supported on the first carriage for movement of the slitter blade longitudinally and transversely of the pipe.

5 Claims, 2 Drawing Sheets

WINDOW CUTTER FOR GAS SERVICE TIE OVERS AND TIE-OVER METHOD

This invention relates to apparatus for cutting windows and elongated slots in tubing. It is disclosed in the context of a window cutter for steel gas main or the like, but is believed to be useful in other areas as well.

Various techniques are known for the insertion of new, smaller diameter, typically polyethylene, gas main into old, larger diameter, typically steel, main while the old main remains pressurized with natural gas. Some of these techniques, as well as the reasons why such insertions are necessary and desirable, are illustrated and described in: Rohrer U.S. Pat. Nos. 3,688,801 and 3,845,789; and Martin et al. U.S. Pat. Nos. 4,009,732; 4,090,534; 4,252,152; and 4,253,497. These patents are listed as exemplary only and no representation is made or intended that they are exhaustive on the current state of this art.

In any event, once the insertion process is completed, it is necessary sooner or later to tie the customers' service over from the outer steel main to the inner polyethylene main. It is in this context that the present invention finds particular utility. In this regard, reference is here made to McManama U.S. Pat. No. 3,115,909 and Martin et al. U.S. Pat. No. 5,009,007.

According to the invention, a pipe slitter comprises a base for fixing the slitter to a pipe to be slit thereby, a carriage for supporting a slitter blade, means for movably supporting the carriage on the base for movement longitudinally of the pipe, and means for movably supporting the slitter blade on the carriage for movement transversely of the pipe.

Illustratively, the base comprises a pair of end plates for mounting transversely of the pipe and a base plate extending between and coupling the end plates to each other. The base plate extends longitudinally of the pipe.

Additionally, the means for movably supporting the carriage on the base comprises a threaded shaft, means for rotatably supporting the threaded shaft between the end plates, and means for rotating the threaded shaft. The carriage includes means for following the threaded shaft.

Illustratively, the means for movably supporting the slitter blade on the carriage comprises a second carriage, a second threaded shaft, the second threaded shaft threaded into the first carriage and rotatably supported by the second carriage, a motor support, a motor supported thereby, means for selectively positioning the motor support on the second carriage, and means for coupling the motor to the slitter blade.

Additionally, the means for selectively positioning the motor support on the second carriage comprises an angle bracket provided on the second carriage, and means for connecting the motor support to the angle bracket in selected relative orientations.

Further according to an illustrative embodiment, the slitter blade comprises a milling cutter, the motor comprises a rotary output shaft, and the means for coupling the motor to the slitter blade comprises means for mounting the milling cutter on the output shaft.

The invention may best be understood by referring to the following description and accompanying drawings which illustrate the invention. In the drawings.

Figure 1:
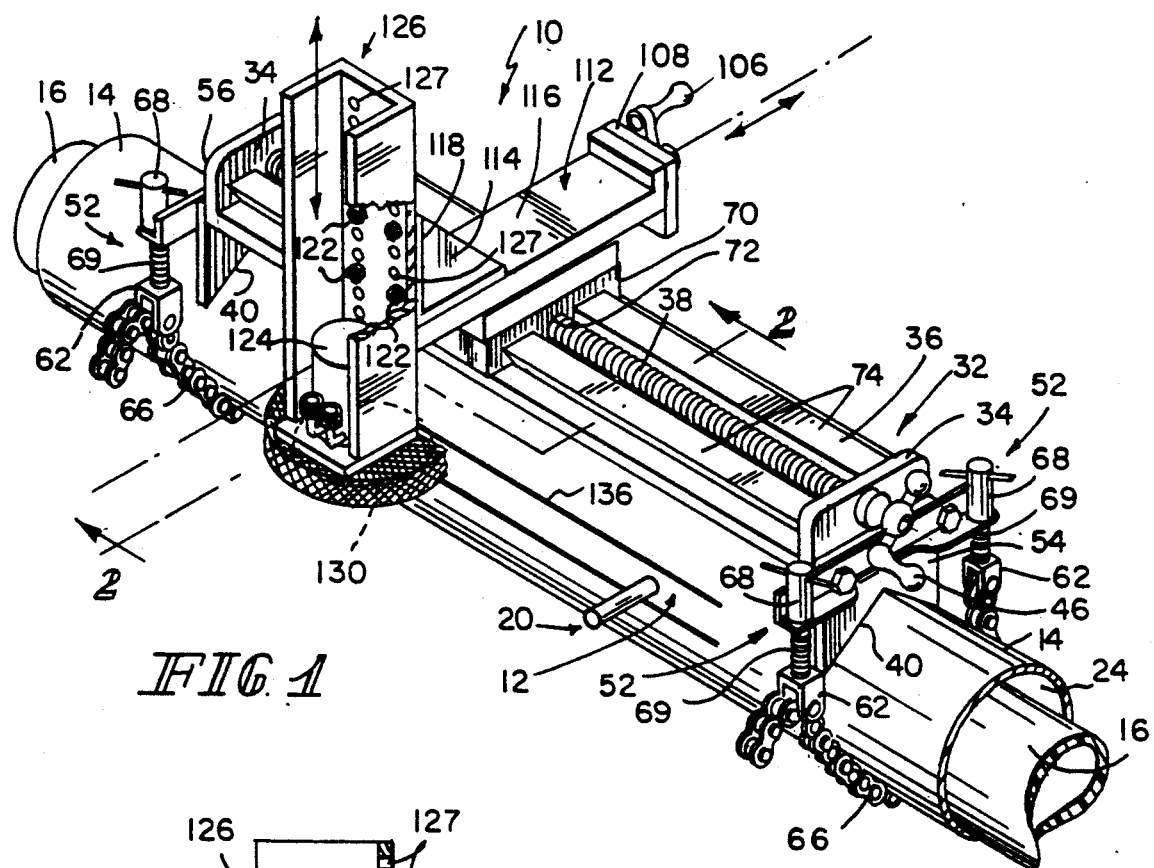
FIG. 1 illustrates a partly fragmentary perspective view of a window cutter according to the present invention.
Figure 2:
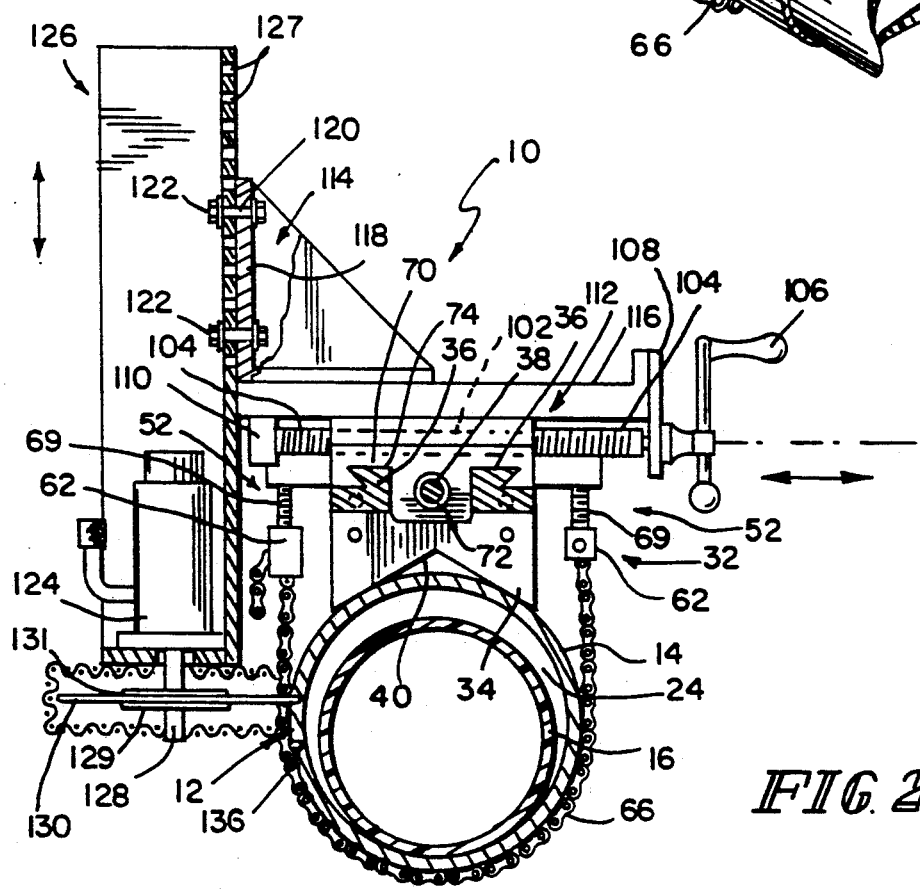
FIG. 2 illustrates a fragmentary sectional view of the window cutter of FIG. 1, taken generally along section lines 2—2 thereof.

The window cutter 10 is used to cut windows 12 in a length 14 of larger diameter steel main into which a length 16 of smaller diameter polyethylene main has been inserted. The windows 12 are ordinarily cut at the locations at which the outer main 14 is tapped 20 to provide gas service to a customer. The windows 12 are cut when it is desirable to tie over the customer's gas service from the space 24 between main 14 and main 16 to the inner main 16. This tying of service over to the inner main ordinarily progresses upstream from the farthest downstream end of the larger diameter steel main 14, so that there is no need to provide a bypass around the window 12 site to continue gas service to (a) downstream customer(s). However, it is not essential to the use of the inventive window cutter 10 that this be the case. It can be used equally as effectively either where some service locations are to be bypassed, providing gas service both upstream and downstream therefrom through the annular space 24 between mains 14 and 16 or where the window 12 location is to be at the farthest downstream end of a length 14 of larger diameter main.

The cutter 10 comprises a frame 32 having a pair of endplates 34 between which extends a carriage guide 36. The endplates 34 are provided on their bottoms with angular cutouts 40 but they are otherwise generally rectangular in shape. Carriage guide 36 is fixed to endplates 34. A lead screw 38 is rotatably mounted between endplates 34. A hand crank 46 is provided on one end of lead screw 38 to rotate lead screw 38.

A clamp mechanism 52 is attached to each of the outwardly facing surfaces 54, 56 of frame 32. Each clamp mechanism 52 includes a pair of pivotal connectors 62. A length 66 of roller chain is coupled between the pivotal connectors 62. Each connector 62 is provided with a handle 68 into which the threaded end 69 of a respective connector 62 threads. Turning one of handles 68 permits tightening of the chain 66 around the length 14 of steel main. This clamps frame 32 to the length 14 of steel main.

Window cutter 10 further comprises a carriage 70. Carriage 70 includes an internally threaded follower 2 on its underside. Lead screw 38 is threaded through follower 72. The underside of carriage 70 is complementarily configured to the upper side 74 of carriage guide 36.

A threaded aperture 102 provided in carriage 70 is engaged by a second lead screw 104 having a hand crank 106 fixed to one end thereof. The ends of lead screw 104 are rotatably mounted to plates 108, 110 provided on a second carriage 112. An angle bracket 114 is provided on the top surface 116 of carriage 112. The upstanding plate 118 of angle bracket 114 is provided with four spaced openings 120 for receiving bolts 122. A hydraulic motor 124 is mounted on a motor support 126 and the shaft 128 of motor 124 extends through a hole provided therefor in motor support 126. Two rows of uniformly spaced holes 127 are provided in motor support 126. Selected ones of these holes 127 are aligned with holes 120 and bolts 122 are passed through these. Nuts are tightened onto bolts 122 to fix the distance between surface 116 and a cutter 130 mounted on motor shaft 128. Nuts 129, 131 are tightened against the axial faces of cutter 130 to position cutter 130 on shaft 128. Hydraulic motor 124 is energized from a suitable source of hydraulic fluid (not shown).

Figure 3:
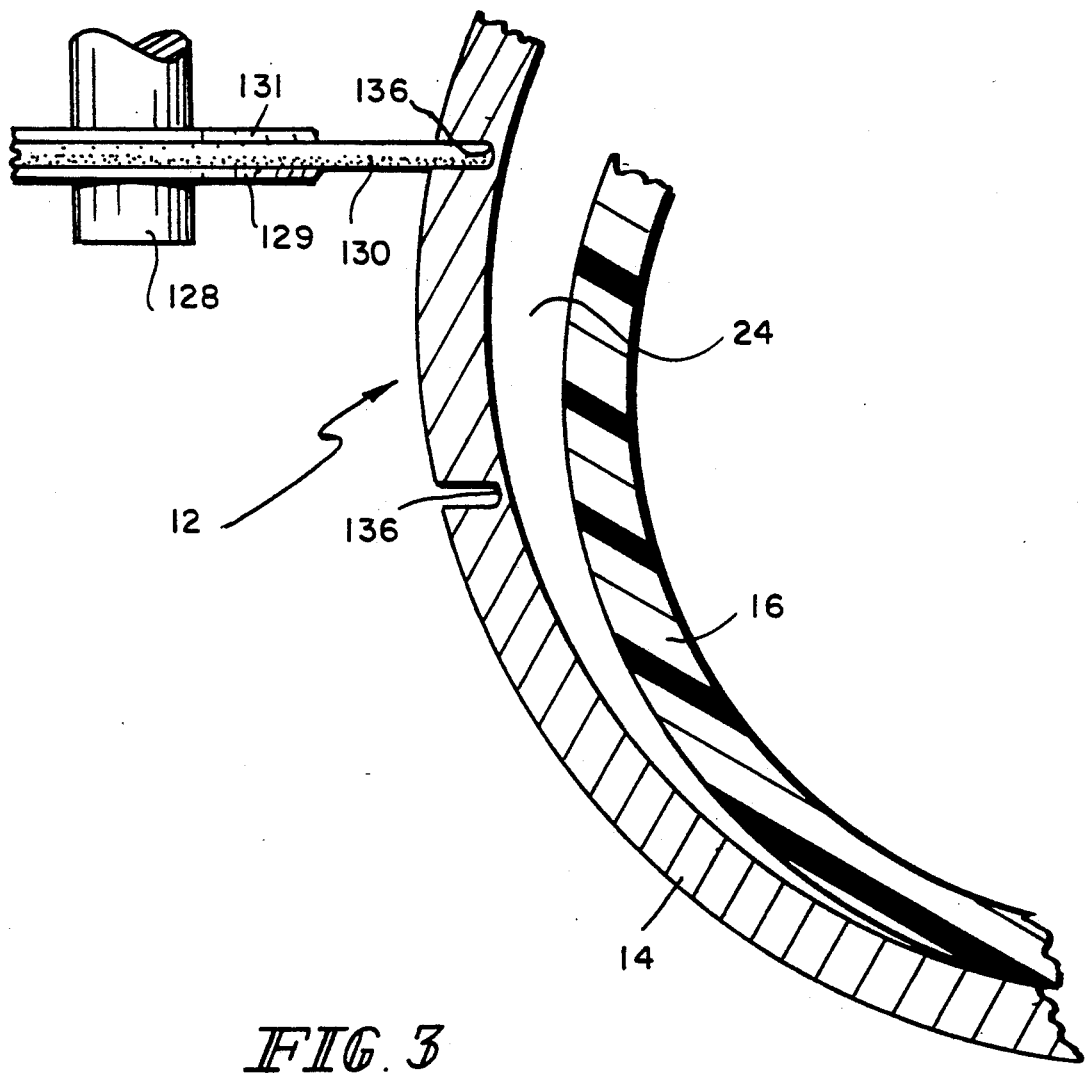
FIG. 3 illustrates an enlarged view of a detail of the window cutter of FIG. 2.

In operation, after the appropriate seal(s) is(are) placed in space 24, window cutter 10 is first clamped, using clamps 52, to the length 14 of steel main, with one of endplates 34 on each side of the site of window 12. Lead screw 104 is turned to bring cutter 130 into contact with the sidewall of main 14 at the point around the circumference of main 14 where the first longitudinal cut is to be made. Motor 124 is started and lead screw 104 is then manipulated to insure that slightly less than the entire thickness of the wall of main 14 has been penetrated (FIG. 3). Since each rotation of lead screw 104 advances cutter 130 a predetermined depth into the sidewall of main 14, a thin web 136 of the sidewall of main 14 can be left at the bottom of each cut. Lead screw 38 is then slowly turned, driving milling cutter 130 the desired distance along the length 14 of main to define one longitudinal edge of the window 12. Lead screw 104 is manipulated to raise cutter 130 out of its cut. Carriage 70 is then returned to the starting point of the cut just made. The clamps 52 are loosened enough to permit tilting of the cutter 10 in one direction or the other until the milling cutter 130 is over the site of the other longitudinal edge of the window 12 and the procedure is carried out again. The ends of the window 12 are then finished, for example, with a pipe cutter, again leaving a thin web of material at the bottom of each cut.

This window area 12 is left in place without fear of leakage of gas until it is desired to tie over the customer service 20 in it to the inner main 16. At that time appropriate entries can be made, seals secured, the window area 12 knocked out, e.g., with a hammer, and the service 20 tied over from the space 24 to the inner main 16. This service tie-over method leaves main 14 sealed at the window 12 edges until it is desirable to make a tie-over. Consequently, a section of main 14 can be prepared at one time for tie-over to main 16 and left so that the tie-overs can be conducted subsequently at the utility's convenience. In addition, leaving the web 136 at the bottom of each cut reduces the likelihood of throwing a spark from the cutter 130. Further, the careful control of the depth of cut in the sidewall of main 14 reduces the likelihood of damage to the sidewall of main 16 during the window 12 cutting process.

What is claimed is:

1. A pipe slitter comprising a base for fixing the slitter to a pipe to be slit thereby, a carriage for supporting a slitter blade, means for movably supporting the carriage on the base for movement longitudinally of the pipe, and means for movably supporting the slitter blade on the carriage for movement transversely of the pipe, the base comprising a pair of end plates for mounting transversely of the pipe and a base plate extending longitudinally of the pipe and coupling the end plates to each other.

2. The pipe slitter of claim 1 wherein the means for movably supporting the carriage on the base comprises a threaded shaft, means for rotatably supporting the threaded shaft between the end plates, and means for rotating the threaded shaft, the carriage including means for following the threaded shaft.

3. The pipe slitter of claim 2 wherein the means for movably supporting the slitter blade on the carriage comprises a second carriage, a second threaded shaft, the second threaded shaft threaded into the first carriage and rotatably supported by the second carriage, a motor support, a motor supported by said motor support, means for selectively positioning the motor support on the second carriage and means for coupling the motor to the slitter blade.

4. The pipe slitter of claim 3 wherein the means for selectively positioning the motor support on the second carriage comprises an angle bracket provided on the second carriage, and means for connecting the motor support to the angle bracket in selected relative orientations.

5. The pipe slitter of claim 4 wherein the slitter blade comprises a milling cutter, the motor comprises a rotary output shaft, and the means for coupling the motor to the slitter blade comprises means for mounting the milling cutter on the output shaft.

* * * * *